Jan. 5, 1965  W. WÜRGLER  3,164,220
AUTOMATIC SPEED-LIMITER FOR VEHICLES, IN PARTICULAR AUTOMOBILES
Filed Dec. 19, 1962  2 Sheets-Sheet 1
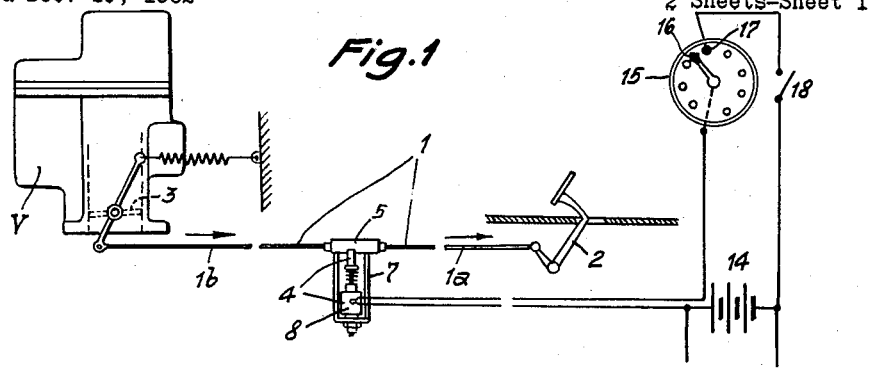
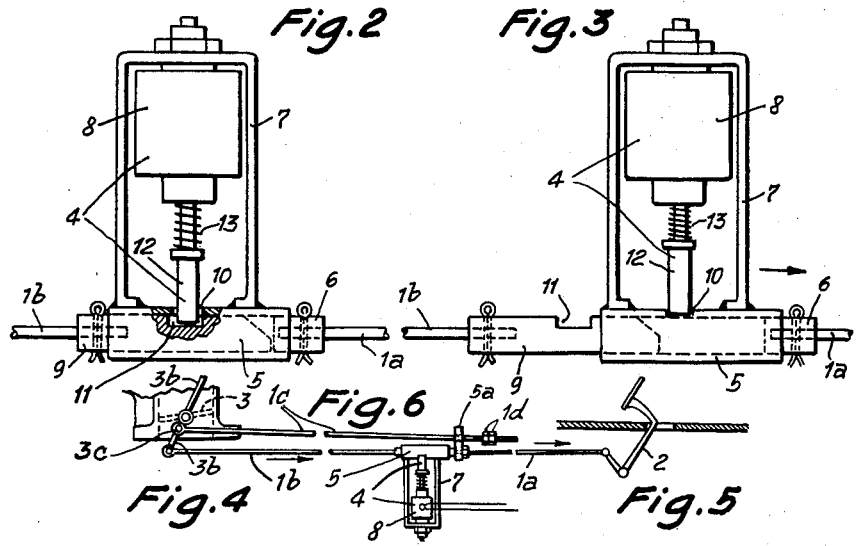
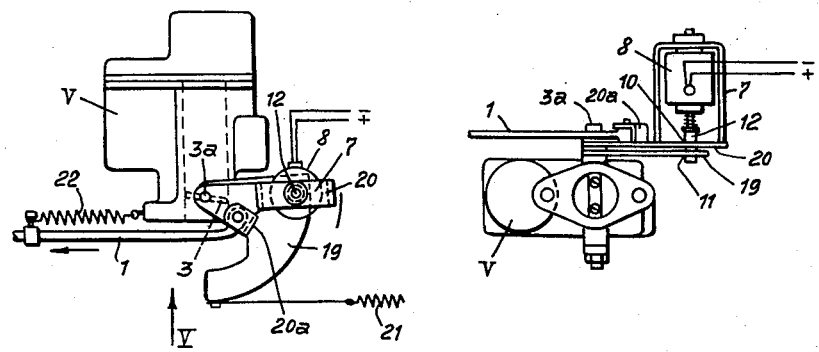
INVENTOR
Willy Würgler
BY
ATTORNEYS Jan. 5, 1965   W. WÜRGLER   3,164,220
AUTOMATIC SPEED-LIMITER FOR VEHICLES, IN PARTICULAR AUTOMOBILES
Filed Dec. 19, 1962   2 Sheets-Sheet 2
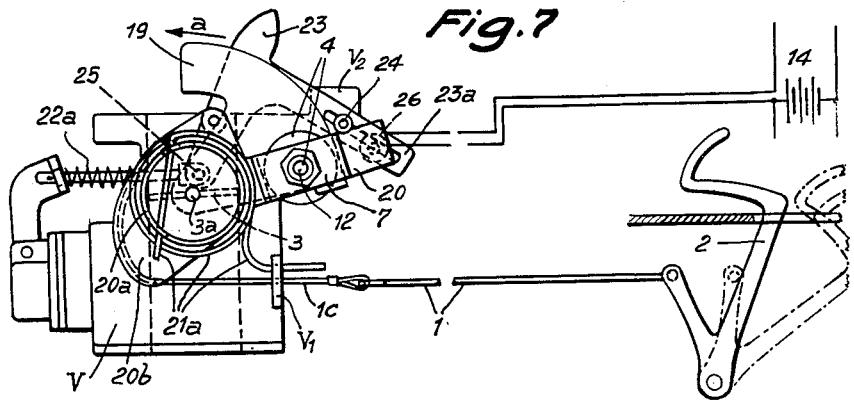
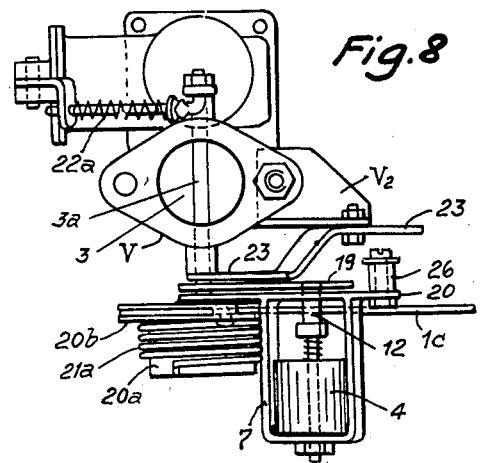
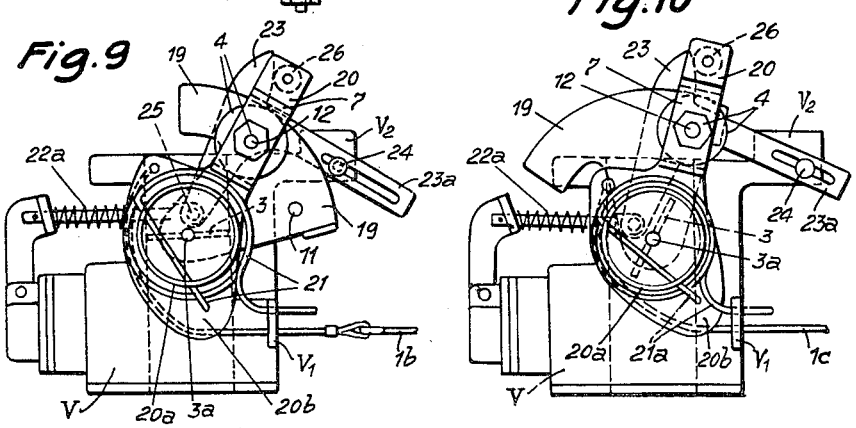
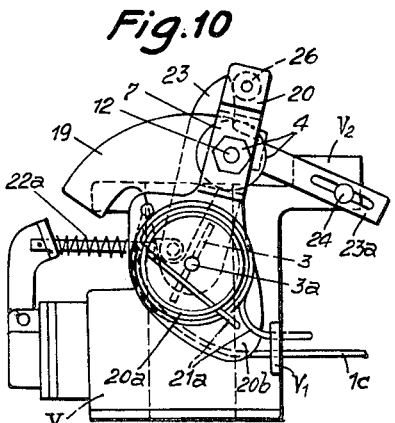
INVENTOR
Willy Würgler
BY Lowry & Rinehart
ATTORNEYS

United States Patent Office 3,164,220
Patented Jan. 5, 1965

3,164,220
AUTOMATIC SPEED-LIMITER FOR VEHICLES, IN PARTICULAR AUTOMOBILES
Willy Würgler, Kirchenfeld 1, Zurich, Switzerland
Filed Dec. 19, 1962, Ser. No. 245,906
3 Claims. (Cl. 180—82.1)

Means for keeping within prescribed speeds in road traffic have already been proposed, in which takes place an optical or acoustic signaling when the definite speed has been attained.

The present invention relates to an automatic speed-limiting unit for vehicles, in particular automobiles. Said unit is distinguished, by the fact that it is positioned in the zone between gas pedal and carburetor. Forms of the invention are shown in the drawing in which—

FIG. 1 is a switching diagram of the speed-limiting unit,

FIG. 2 is a view of the electromagnetic coupling in the closed position, partly in section, FIG. 3 shows the electromagnetic coupling in the open position, partly in section, FIG. 4 is an elevation of a version of an electromagnetic coupling intended to be built on directly to the carburetor, FIG. 5 is a view in the direction of the arrow V in FIG. 4, FIG. 6 is a partial view of a third example of the unit, FIG. 7 depicts a fourth example of the speed-limiting device, FIG. 8 is a partial top plan view of FIG. 7, FIG. 9 is a partial view pertaining to FIG. 7 when actuating the gas-pedal with the throttle valve lever uncoupled, and FIG. 10 is a partial view pertaining to FIG. 7 when the gas-pedal has been entirely depressed and the throttle valve thus is open.

The speed-limiting unit shown in FIG. 1 comprises in a first form, as shown in FIGS. 1 to 3, an electromagnetic coupling 4 built into the connecting linkage 1 between gas-pedal 2 and gas throtle valve 3. Coupling 4 comprises a sleeve 5 (FIGS. 2 and 3) which is closed by a connecting piston 6 and through same is fixed to a linkage member 1a. Sleeve 5 carries a stirrup 7 which carries an electromagnet 8. In the opening at the other end of sleeve 5 is engaged a clutch piston 9 which is movably guided in the sleeve and fixed to another member 1b of linkage 1. Sleeve 5 and piston 9 slidable therein comprise on their sides facing the electromagnet 8, an opening 10 and a recess 11 respectively which in the coupling position of the parts 5 and 9 register with each other and in the de-energized state of the electromagnet hold the coupling closed by engagement of the iron-core 12 in opening 10 and recess 11, said iron-core serving as sliding bolt. The iron-core 12 through excitation of electromagnet 8 is pulled back from recess 11 of coupling piston 9 against the action of the compression spring 13 disposed on the iron-core, whereby the coupling is disengaged. In this case, connecting linkage 1 in coupling 4 is interrupted so that on actuation of gas-pedal 2 the linkage parts 1b, 9 will not be taken along, as shown in FIG. 3. Electromagnet 4 is connected to the current-source 14. In the circuit of electromagnet 4 is included the speedometer 15 of which the pointer is provided with a sliding-contact piece 16 which co-acts with a contact piece 17 adjustable on the speedometer dial. This adjustable contact piece 17, in the case illustrated, is set to the 60-kilometer mark and effects closure of the circuit via electromagnet 8 as soon as contact piece 16 of the speedometer pointer runs up on contact piece 17. This, however, only is the case when a manual switch 18 is closed. In the latter, however, in the open position, as shown in FIG. 1, the automatic speed-limiter is out of operation. A switch 18 mounted on the instrument panel within closest reach of the driver is to be closed when entering an area of limited speed, and is to be opened again when leaving said area. Switch 18, however, also may be opened for a short time within a speed-limiting area when overtaking another car.

In the form of invention shown in FIGS. 4 and 5, the electromagnetic coupling has been brought in switching connection with the throttle valve lever 19 of carburetor V which engages axle pin 3a. To such end, holder stirrup 7 which carries electromagnet 8 is secured to a lever 20 which is pivoted on the throttle valve axle 3a and in the position shown in FIG. 4 holds the gas throttle valve closed. Linkage 1 which leads to the gas pedal engages a bearing fork 20a of lever 20. Throttle valve lever 19 and lever 20 are provided with a bore 10 and 11 respectively for engagement of iron core 12 of electromagnet 8, which core serves as sliding bolt. In the non-loaded position of the gas pedal, the levers 19 and 20 are in the position shown in FIG. 4 in which they are retained by springs 21 and 22. The two levers 19, 20 are pivotably interconnected by the iron-core 12 of the electromagnet when the circuit is interrupted, so that the gas throttle valve 3 is normally serviceable by the gas pedal. The magnet circuit is interrupted when switch 18 is open, and also when the latter is closed, as long as the limit (60 km.) set on the speedometer has not been attained yet.

When switch 18 is open, the throttle may be actuated at any driving speed, since in this case the coupling is closed.

Alternatively, a fluid pressure-operated system (not shown) may be substituted for the mechanical and electro-mechanical system disclosed and described in the exemplary embodiments.

The circuit acting on relays or electromagnets also may be controlled by photo-electric means, interruption of the light-ray being effected by the speedometer pointer. The automatic speed-limiting device described shall be adjustable, in speed-limit areas, to the respective kilometer-mark, for example 60 km., so that on attaining said mark the service linkage connecting the gas lever to the throttle will be interrupted by the coupling and the throttle with closed manual switch cannot sooner be opened again than the speed limit is understepped or the hand switch is opened.

With the second example shown in FIG. 6 another car may be overtaken, within a speed limit area, without opening switch 18, simply by actuating the gas pedal 2. To such end, a dog 5a is secured to part 1a of the linkage 1a, 1b interconnecting gas pedal 2 and throttle lever 3b. In a corresponding bore of said dog is slidably guided an additional rod 1c of which one end is connected to a pivot pin 3c of throttle lever 3b and of which the other end carries a stop 1d constituted by two nuts and adjustable on a threaded portion of rod 1c, which stop is destined for coaction with dog 5a. The force arm of the throttle-lever section which engages rod 1c, is substantially smaller than that which engages linkage member 1b.

When the speed-limiter is turned on, i.e. when switch 18 is closed, coupling 5, 9 is disengaged by withdrawing bolt 12 when the set speed limit is attained, i.e. when the pointer provided with the sliding contact 16 runs up on contact piece 17 which is set, for example, on the 60 km.-mark, whereby linkage 1a, 1b is interrupted. In such case, throttle 3 cannot any longer be opened via linkage 1 with normal actuation of the gas pedal. When the driver wishes to overtake another car without actuation of hand switch 18, the switching path of the gas pedal upon actuation of the latter has to exceed its normal length and the gas pedal has to be depressed with greater force. When actuating the gas pedal within the normal operating path, dog 5a slides upon rod 1c up to stop 1d. The further switching path of the gas pedal now requires a correspondingly greater force for fully opening throttle 3, on account of rod 1c engaging throttle lever 3b with a substantially shorter force arm, but a so much shorter final switching path instead. When the driving speed drops below the prescribed speed limit set by the limiter, the circuit is interrupted by the speedometer pointer so that upon releasing the gas pedal, coupling 5, 9 of linkage 1 is engaged again to thereby again render possible actuation of the throttle below the set speed limit. In the same manner coupling 5, 9 is engaged by opening hand switch 18.

In the fourth example of the automatic speed-limiter (FIGS. 7 to 10) a lever arm 20 is pivoted on the throttle axle pin 3a and in the holder stirrup 7 of arm 20 is disposed the electromagnetic coupling 4. On a cylindrical part 20a of lever 20, which is concentric with throttle axle pin 3a, is mounted a torsion spring 21a of which one end is held to a strap $V_1$ disposed on carburetor housing V, while the other end of said spring is anchored on the cylindrical part 20a of pivotable arm 20. The latter by torsion spring 21a is urged to its basic position and through linkage 1 and a flexible tension element 1c connected thereto is pivotable from said basic position in the sense of arrow $a$ (FIG. 7). Element 1c runs on a rope pulley segment 20b of arm 20 and is connected thereto. To throttle axle pin 3a is fixed a lever 19 which is pivotable to actuate throttle 3. Lever 19 through a compression spring 22a is urged to its basic position and comprises a catch 11 to which is engaged iron-core 12 of electromagnet 4 when the circuit of electromagnet 4 is interrupted. To a pin 25 of lever 19 is pivoted a link 23 of which the slotted guide part 23a is slidably guided on a pin 24 of a part $V_2$ secured to the carburetor. With the outer end of link 23 coacts a roller 26 of lever 20 on the end portion of its pivotal path when, with throttle lever 19 disengaged, lever 20 is actuated by tension element 1b. Electromagnet 4 is connected to current source 14 in the same manner as in the first example, speedometer 15 being incorporated in the circuit of the electromagnet. The pointer of speedometer 15 is provided with a sliding contact 16 which coacts with a contact piece 17 adjustable on the speedometer-dial.

The mode of operation of this example is the same as in the example shown in FIG. 6. Upon attaining the speed limit set for example, to 60 km. per hour, and, when hand switch 18 is closed, the circuit via electromagnet 4 is closed for as long as the vehicle speed does not drop below 60 km. In this case, the coupling between the two levers 19, 20 is disengaged, and in normal operation of gas pedal 2 the throttle 3 cannot be actuated, as shown in FIGS. 7 and 9. If now, however, a short transient vehicle acceleration is nevertheless required within the speed-limit area, for example when overtaking another vehicle, the necessary excess speed may be attained also with the aid of gas pedal 2 and without opening hand switch 18, by fully depressing the pedal 2. In such a case, roller 26 of arm 20 impinges on the stop of link 23 and moves the latter in the direction of arrow $a$ in FIG. 7.

Such latter movement causes an adequate pivotal movement of throttle lever 19 and a corresponding opening of throttle 3 with a slight additional path of pivotal movement of arm 20 while taking along link 23, as becomes evident when comparing FIG. 9 with FIG. 10.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. In a motor control system for a vehicle having an accelerator pedal, a carburetor with a throttle lever operated by said accelerator pedal and a speedometer device for reflecting operation of said carburetor by said accelerator pedal, the improvement comprising in combination, a first rod pivotally connected to said accelerator pedal, a dog fixed to said first rod, a second rod pivotally connected to the free end of said throttle lever, a spring-loaded locking device interconnecting said first and second rods, said locking device being controlled by said speedometer device and adapted to disconnect at a predetermined speed registered on said speedometer, and a third rod pivotally connected to said throttle lever between its free end and its swivelling axle and cooperating with the dog fixed to said first rod, an abutment at the free end of the third rod, said dog being adapted to strike against said abutment positioned at the free end of said third rod after a predetermined relative movement between said first and said third rod caused by the disconnection of said locking device.

2. The structure of claim 1 in which said abutment is adjustably mounted on said third rod.

3. The structure of claim 1 in which said locking device comprises a telescopically engageable sleeve and rod element, a bolt element mounted on said sleeve and extendable therein, said rod element including a notch engageable with said bolt, said bolt including an electromechanical power portion, and said speedometer including a speed-controlled power portion for energizing said electro-mechanical power portion.

References Cited by the Examiner
UNITED STATES PATENTS

| | | |
|---|---|---|
| 2,164,114 | 6/39 | Kolb. |
| 2,214,567 | 9/40 | Rosenthal _____ 180—82.1 |
| 2,226,425 | 12/40 | Epperson _____ 180—82.1 |
| 2,228,393 | 1/41 | Leaming. |
| 2,263,228 | 11/41 | Wolff et al. |
| 2,822,702 | 2/58 | Scheppe. |
| 2,870,892 | 1/59 | Hiner _____ 180—82.1 X |
| 3,072,210 | 1/63 | Cramer _____ 180—82.1 |
| 3,077,239 | 2/63 | Simas _____ 180—82.1 |

PHILIP ARNOLD, *Primary Examiner.*

A. HARRY LEVY, *Examiner.*